United States Patent [19]
Cardwell et al.

[11] 3,992,507
[45] Nov. 16, 1976

[54] HALIDATION OF MANGANIFEROUS ORE TO OBTAIN METAL VALUES AND RECOVERY AND RECYCLE OF HALIDE VALUES

[75] Inventors: Paul H. Cardwell, Zanoni; William S. Kane, Wicomico, both of Va.

[73] Assignee: Deepsea Ventures, Inc., Gloucester Pt., Va.

[22] Filed: Apr. 26, 1974

[21] Appl. No.: 464,550

Related U.S. Application Data

[63] Continuation-in-part of Ser. No. 336,547, Feb. 28, 1973, Pat. No. 3,832,165.

[52] U.S. Cl. .................................. 423/51; 75/80; 423/139; 423/491; 423/493; 423/488; 423/633; 423/657
[51] Int. Cl.² ..................................... C01G 45/02
[58] Field of Search ............... 423/49, 50, 51, 605, 423/491, 493, 139, 633, 488, 657; 75/80; 136/139

[56] References Cited
UNITED STATES PATENTS

| | | | |
|---|---|---|---|
| 2,045,092 | 6/1936 | Mitchell | 423/491 |
| 2,154,128 | 4/1939 | Jacobs | 423/51 |
| 2,658,813 | 11/1953 | Whitehouse et al. | 423/49 |

FOREIGN PATENTS OR APPLICATIONS

| | | | |
|---|---|---|---|
| 40,474 | 1/1958 | Poland | 423/51 |

Primary Examiner—M. J. Andrews
Attorney, Agent, or Firm—Barry G. Magidoff

[57] ABSTRACT

This invention provides a halidation process for obtaining a high purity manganese oxide from a manganiferous ore, while reclaiming a substantial portion of the hydrogen halide reagent. The process comprises halidating the ore with a hydrogen halide and leaching to form the corresponding halogen and an aqueous solution comprising dissolved manganese halide and ferric halide. The hydrogen halide can be in the gaseous state and/or dissolved in the aqueous leach solution.

The manganese halide and the ferric halide are preferably individually separated from the leach solution by crystallization and by selective extraction, respectively. The crystallized manganese halide is reacted with water at a temperature of from about 400° C to about 700° C to yield the corresponding hydrogen halide, which is recycled, and manganese oxide.

In one embodiment, a concentrated leach solution is formed at a temperature of at least about 90° C using at least some gaseous hydrogen halide as the reagent, the solution having a concentration of manganese halide greater than the saturation concentration at ambient temperaures. The solution is then cooled to ambient and the manganese halide crystallized out. The ferric halide is then extracted from the solution. In a second embodiment, the ferric halide is first extracted from the leach solution and the manganese halide is then crystallized by evaporating the gaseous solution.

If other nonferrous metal values are present, these can be removed by precipitation or cementation. Any remaining aqueous liquid is preferably recycled.

39 Claims, 1 Drawing Figure

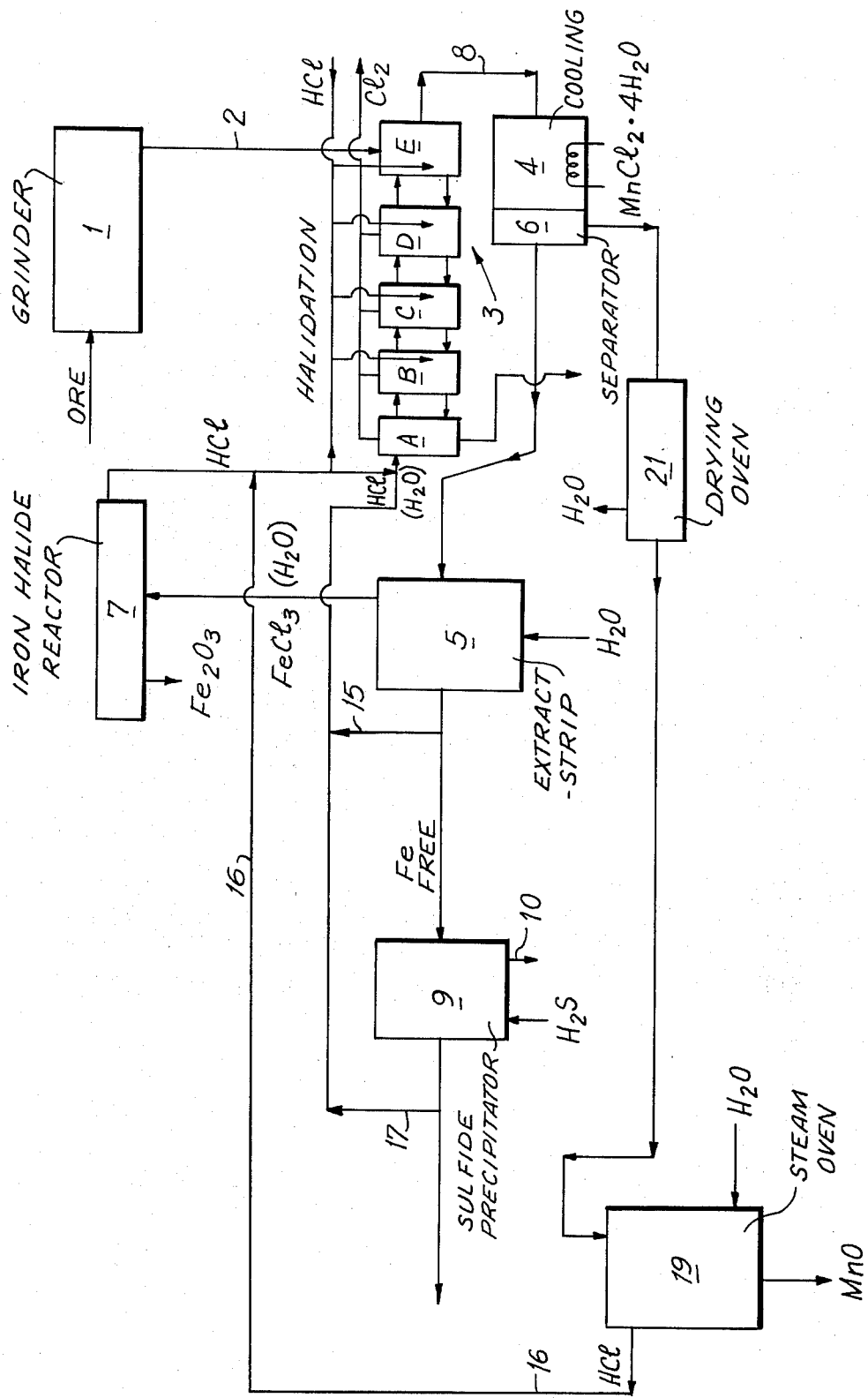

HALIDATION OF MANGANIFEROUS ORE TO OBTAIN METAL VALUES AND RECOVERY AND RECYCLE OF HALIDE VALUES

This application is a continuation-in-part of U.S. application Ser. No. 336,547, filed Feb. 28, 1973, and now U.S. Pat. No. 3,832,165.

Manganese is often obtained from manganiferous oxidic ores, where the metal values are present as oxygen compounds especially the e.g. manganese dioxide. Often, these manganiferous ores include relatively large proportions of iron compounds as well as other metals in generally much smaller quantities, e.g., less than one percent by weight of nickel, copper, cobalt, zinc and lead.

Processes for refining ores, containing divalent manganese in an oxide compound e.g. MnO or $MnSiO_3$, to win the metal have included chloridating of the ore by reaction with a metal chloride generally an alkali metal chloride or an alkaline earth metal chloride, to form the corresponding manganous chloride. Manganous chloride is generally formed together with an iron chloride; the reacted ore is then leached, the manganese and iron chlorides dissolve and the aqueous solution separated from the remaining insoluble residue. The leach solution is then treated so that the iron is removed, commonly by adding a base, such as calcium hydroxide, to increase the pH to about 3 to 4 to precipitate the iron as the oxide. The oxide is filtered off and additional base can be added to increase the pH to above 8, so as to precipitate manganese hydroxide, e.g. $Mn(OH)_2$. The manganese hydroxide is filtered from the solution and then calcined to form the corresponding oxide. This oxide has then been used as a feed in the production of ferro-manganese in reduction furnaces. A problem with the above procedure, however, is that it is limited to treating ores containing manganese oxides wherein the manganese is in the divalent state. A further difficulty is that the procedure requires filtering the very fine almost gelatinous manganese hydroxide and iron oxide precipitates.

Manganiferous ores have also been refined following other procedures including initially reacting the ore with hydrochloric acid, hydrogen chloride gas, nitrogen dioxide (aqueous solution or dry gas), nitric acid, ammonia-carbon dioxide aqueous leach and treatment with ammonium sulfate. These procedures, however, are limited to ores having a narrow range of manganese-to-iron ratios. For a general summary of various procedures for treating ores to recover manganese, see *Review of Major Proposed Processes for Recovering Manganese from United States Resources*, by Norman and Kirby, (United States Department of the Interior publication, Bureau of Mines, Information Circular 8160, 1963).

Manganese is a valuable metal having many uses in modern industry, e.g. it is used in admixture with iron, as in steel, and alloyed with other metals, such as copper, chromium, nickel and aluminum. The different uses require different minimum degrees of purity. Manganous oxide also has a wide range of uses where the minimum degree of purity ranges from the relatively pure compounds for use in medicines and food, to the materials used in prints, ceramics, textile printing and glass manufacture.

The present invention provides a halidation process for obtaining a high purity manganese oxide and, if desired, manganese metal, from even a low grade manganese oxide ore which also contains iron in substantial proportions. This invention further provides a halidation process for obtaining relatively pure manganous halide leaching halidated ore at elevated temperatures to obtain a concentrated solution of manganous halide and the cooling the hot leach liquor to crystallize out substantially pure manganous halide. The process is highly efficient in generating elemental halogen, as a valuable by-product, and in providing for recycle of that remaining portion of the halide value of the primary reagent which reacts to form the manganese halide, and also preferably that portion which reacts to form the iron halide, i.e., substantially all of the halide value is either recoverable as the halogen or recycled.

In accordance with the present invention, a process is provided for obtaining high purity manganese oxide and elemental halogen, from manganese oxide ore, while recycling a large portion of the prime reagent, i.e., hydrogen halide. It is possible to process such manganese oxide ores which also contain other nonferrous metal values to obtain such other valuable nonferrous metals. Ores which can be usefully treated by this invention comprise as primary components oxide compounds of manganese and iron, and, preferably, secondary amounts of compounds of other nonferrous metals such as copper, cobalt, nickel, zinc and lead. The process comprises 1. halidating the ore with a hydrogen halide to form the corresponding elemental halogen and leaching with an aqueous solution to form an aqueous leach solution of the halides of the metal values present in the ore, including manganous halide and ferric halide, and the halide of any other nonferrous metal present in the ore; 2. separating solid manganous halide from the aqueous solution; 3. reacting the manganous halide with water at elevated temperatures in the range of about 400° to about 700° C, and preferably about 500° to about 600° C, to yield manganous oxide and vaporous hydrogen halide; and 4. recycling the hydrogen halide so formed to halidate the ore.

The term "manganese oxide" encompasses oxides of manganese wherein manganese has a valence of at least 3, and preferably 3 or 4 or a compound of manganese which when heated is converted to such an oxide.

In a preferred aspect of this invention, the ore is a metallurgical grade manganese ore wherein the ratio of manganese-to-iron is at least about 5:1, preferably at least 6:1, and most preferably at least about 7:1.

The leach solution is also preferably initially obtained at elevated temperatures, preferably of at least about 90° C, most preferably at least about 95° C up to the boiling point, and optimally substantially as close to the boiling point of the solution as possible without actually boiling. The proportion of water-to-reacted ore is adjusted so that substantially all of the metal values are dissolved in the leach solution at the elevated temperatures but the concentration of dissolved manganese halide in the leach solution is above that which is soluble at lower temperatures; most preferably, the concentration of the other metal values is not above their saturation concentration at such lower temperatures. In this preferred aspect, the halidation should be carried out simultaneously with the leaching, using an aqueous, most preferably saturated, hydrogen halide solution plus adding additional gaseous hydrogen halide during the halidation-leaching procedure.

Alternatively, it is possible in accordance with this invention, to use gaseous hydrogen halide, followed by leaching with water at the elevated temperatures, i.e., at least about 90° C. If gaseous hydrogen halide is used, the temperature is preferably sufficiently great to evaporate off the water of reaction, and optimally above about 200° C.

Following either procedure, the hot concentrated solution is optimally as close to saturation as possible in manganese halide. More generally, the concentration of manganese halide should be such that at least about 20%, and preferably at least about 50%, of the manganese halide crystallizes out at the temperatures to which it is cooled. The maximum concentration of the manganese halide in the hot leach solution is further limited so that, as stated above, the other metal salts do not crystallize when cooled. The hot leach solution is then cooled to such lower temperatures, preferably to a temperature not greater than about 60° C, and most preferably not greater than about 30° C, and optimally substantially to ambient temperature, to cause the crystallization of a substantial portion of the manganese halide; the crystallized manganese halide, in a relatively pure state, can be separated out. The unusually steep temperature — solubility curve for manganese halide in water, makes this procedure possible and enables the separation of a substantial portion of the manganese halide from other metal values present in the ores, especially iron, and the non-ferrous metals which are present in relatively low concentration, such as nickel, copper and cobalt. Generally, using only an aqueous solution of the hydrogen halide, even one which is initially saturated in the hydrogen halide, without passing additional gaseous hydrogen halide during leaching, does not result in a sufficiently concentrated solution of the manganous halide to crystallize out a substantial quantity when the leach solution is cooled.

In the above preferred aspect, a portion of the manganese halide remains in the cooled leach solution together with the ferric halide and any other nonferrous metals which were leached from the ore. The cooled leach solution is then preferably treated to selectively extract the ferric halide therefrom, leaving the remaining halides in solution, including the uncrystallized manganese halide. In an alternative embodiment, when the leaching is carried out at substantially ambient temperature, and/or further cooling is not provided, or if the leach solution of manganese halide which is formed is of insufficient concentration to crystallize manganese halide when cooled, the ferric halide extraction is carried out on the leach solution. The dissolved manganese halide is then recovered as solid manganous halide, as detailed below, after the ferric halide is extracted.

Preferably, when the ore contains other nonferrous metal values, it is preferable to remove from the leach solution, after extracting the iron, any metal values which are more noble, that is, lower on the electromotive force scale, than manganese. This can be done, for example, by precipitation as the sulfides from the aqueous solution and separating the aqueous solution containing the still dissolved manganous halide from the precipitated metal values, or by extraction.

When the ore also includes compounds, e.g. of alkali metals, which remain with the aqueous solution of manganous halide after the removal of the nonferrous metal values, above, such dissolved metals may also be separated out with the later crystallized manganous halide and therefore render less pure the final manganous oxide obtained. These compounds, however, such as the halides of the alkali metals, are not detrimental for many purposes. Where it is desired to obtain a highly pure manganous oxide, many of these metal compounds, especially the alkali metal compounds, can be readily removed by leaching the manganous oxide with neutral, or basic, water. Manganous oxide is insoluble therein, but, e.g., the halides of the alkali metals, which are generally not hydrolized to their oxides with the manganese values, are readily soluble. The solid manganous oxide can be readily separated from the water solution.

The ore is preferably first comminuted to a particle size of preferably not greater than about 10 mesh on the U.S. sieve scale, and most preferably to a size in the range of from about 35 to about 100 mesh.

Useful halidating agents, therefor, include both the anhydrous hydrogen halides and the aqueous solutions of hydrogen halides, such as hydrogen chloride, hydrogen bromide and hydrogen iodide. The chloride is generally preferred: it is gaseous at normal temperatures, is not overly reactive and thus can be readily handled but yet is sufficiently reactive so as to react at a sufficient rate to produce elemental chlorine gas and the manganous chloride in economical quantities.

The leaching of the ore is carried out substantially simultaneously with the halidation when an aqueous solution of a hydrogen halide is used, preferably with added gaseous hydrogen halide, as explained above. Such leaching is highly exothermic and the temperature of the leach solution usually maintains itself at least at about 80° C. As pointed out above, it is preferred to initially obtain a leach solution at more elevated temperatures, i.e., of at least about 90° C.

When anhydrous hydrogen halide is utilized, higher temperatures, preferably at least about 200° C, up to about 600° C, can be utilized, if desired. However, preferably, temperatures above the range of about 200° C to about 300° C are unnecessary and not commonly used. The reacted ore is subsequently leached with an aqueous solution. The leaching is carried out at any liquid phase temperatures, however, as explained above, it is preferred to leach at a temperature of at least about 90° C to obtain a concentrated solution which crystallizes when cooled. The aqueous leaching solution should have a pH of not greater than about 2.5, and preferably, from about 1.5 to about 2.5 and optimally about 1.8 to about 2.2.

In one preferred aspect of the vapor phase reaction of the nodule ore, the reacted ore is maintained at a temperature of at least about 200° C, a small amount of water is admitted to hydrolyze the ferric halide in the reacted ore to ferric oxide and hydrogen halide. The hydrogen halide thus formed reacts with additional ore in the halidation step. The reacted ore is then leached with water at a temperature of at least about 90° C to form a highly concentrated solution almost saturated in manganous halide, which is separated from the unreacted residue, including the hydrolyzed iron oxide.

The aqueous leach solution obtained by either of the procedures described above, i.e., the reaction between an aqueous hydrogen halide solution and a manganiferous ore or the reaction using anhydrous hydrogen halide followed by leaching of the reacted ore, contains the desired manganese halide, other non-ferrous metal halide impurities which may be present and the ferric halide. The halides formed during the reaction with the aqueous solution of the hydrogen halide are substantially immediately dissolved into the aqueous solution.

The aqueous hydrogen halide solution preferably is at least 3 N in the hydrogen halide and must be mixed with the ore at least in a stoichiometric amount to react with the desired metal values, and any of the iron and other, highly reactive, metal values present. Preferably, additional pure hydrogen halide can be added to the solution while it is in contact with the ore, as by bubbling the gaseous hydrogen halide through the liquid. The aqueous leach solution, after reaction with the ore, should have a pH of not greater than about 2.5, in order to keep the ferric halide in solution. Optimally, a pH of not more than about 2 is obtained.

The total amount of leaching solution used is preferably enough to dissolve substantially all of the metal values in the ore; most preferably a concentrated solution of manganese halide is obtained, optimally as close to saturation as possible, at the leaching temperature. Generally, in the type of ores to be treated by this procedure, the relative amounts of manganese and other desirable metal values is such that a leach solution can be obtained which is saturated in manganese halide at the elevated temperatures, but which is not saturated in the other desirable nonferrous metal halides at either the leach temperature or at lower, e.g. ambient, temperatures to which it is to be cooled.

The iron halide can be separated from the manganese halide in the aqueous leach solution by different methods. For example, the leach solution can be evaporated to dryness and the crystallized mixed metal halides maintained at about 200° C in the presence of water to convert iron halide to insoluble iron oxide, and then releached to dissolve the manganese halide. Preferably, however, the manganese halide is crystallized out and/or the aqueous leach solution is extracted with a liquid extracting medium comprising an extracting agent selective to remove the iron halide.

The ferric halide can be extracted utilizing an extracting agent which is selective to remove ferric halide from an aqueous solution containing the other metal halides formed during the halidation of the ore and from which the ferric halide can be readily stripped. The ferric halide extracted out and stripped can be converted to hydrogen halide and $Fe_2O_3$ at elevated temperatures. The hydrogen halide is preferably recycled to the halidation reactor and the $Fe_2O_3$ is separated out.

The ferric halide extracting medium is preferably a liquid which is optimally immiscible with water and which selectively extracts ferric halide from a mixture of other metal halides present in the solution. It should be pointed out at this time that the extraction is of the complete ferric halide compound. This is not an ion-exchange situation where the metal ion is chelated or complexed with the chelating agent and the halide ion remains behind. It is preferred in carrying out this procedure that the halide be removed together with the iron into the extractant, in order to recycle the halide value.

The extracting medium is preferably immiscible with water to improve the economic efficiency of the process. If the extracting medium were not immiscible with water, a substantial loss of the extracting agent would occur during each extraction by virtue of at least a partial solubility in the water phase and a loss of the extracting agent in the aqueous raffinate.

Extracting agents which are especially suitable because they are highly specific to ferric halides in the mixed halide solutions which are obtained, e.g. from manganiferous ores, include, for example, certain organic amines and organic phosphate esters. These organic phosphate esters and organic amines are specific for the extraction of ferric halides from an aqueous solution comprising ferric halides, copper halides, nickel halides, cobalt halides and manganese halides. These organic amine and organic phosphate ester materials are preferably used in solution in solvents which are immiscible with water.

The organic phosphate esters which can be used for preferentially extracting iron halide include preferably the trialkylphosphates. Such materials have the general formula:

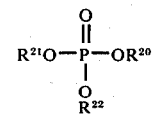

wherein the R groups may be the same or different organic groups, especially hydrocarbon groups and, are optimally alkyl groups, containing from 1 to about 10 carbon atoms, preferably from 2 to 8 and optimally 3 to 6 carbon atoms.

Examples of such materials include tri-n-butyl phosphate, tri-n-hexyl phosphate, n-butyl-di-n-hexyl phosphate, n-propyl-di-n-butyl phosphate, tri-n-propyl phosphate and triamyl phosphate. Esters containing aromatic and cycloaliphatic groups would also be useful in this invention and include triphenyl phosphate, phenyl di(2-ethylhexyl) phosphate and tri(cyclohexyl) phosphate. Tri(n-alkyl) phosphates are most preferred.

The amines which can be used for extracting preferentially iron halide include the primary, secondary, tertiary and quaternary amines. Preferably the amines are aliphatic amines wherein each aliphatic group has from 1 to about 30 carbon atoms; preferably the total number of carbon atoms in the molecule is at least about 12 carbon atoms. The most preferred aliphatic amine extractants include a tertiary alkyl group especially trialkylmethyl group, having the formula

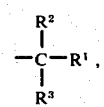

wherein $R^1$ contains from about 9 to about 30 and preferably from about 18 to about 24 carbon atoms, and $R^2$ and $R^3$ contain from 1 to about 4 carbon atoms, and preferably are methyl groups. The preferred extractants can be primary aliphatic amines having the formula $R-NH_2$, wherein R is the above tertiary alkyl group. Examples of such primary amines include the N-trialkylmethyl-amines such as N-(1,1-dimethyleicosyl) amine and N-(1,1-dimethyldocosyl) amine.

Preferred secondary amines include compounds having the formula:

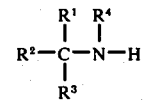

wherein $R^1$, $R^2$ and $R^3$ are defined as above and $R^4$ is preferably an alkyl group containing from 1 to about 20 carbon atoms. An example of such a preferred secondary amine is N-lauryl-N-(1,1-dimethyleicosyl) amine.

Preferred tertiary amines have the formula:

wherein $R^a$, $R^b$ and $R^c$ are alkyl groups, preferably normal alkyl groups each containing from about 5 to about 15 carbon atoms and optimally from about 8 to about 10 carbon atoms; preferred such compounds include tri-(n-octyl)amine, di(n-octyl)-n-hexylamine di(n-hexyl)-n-octylamine, di(n-octyl)(n-decy)amine, di(n-decyl)(n-octyl)amine and tri(n-decyl)amine.

Quaternary ammonium compounds can also be utilized as extractants and the preferred such ammonium groups can empirically be defined by the following equation:

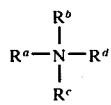

wherein $R^a$, $R^b$ and $R^c$ are as defined above and $R^d$ is hydrogen or a lower alkyl group containing from 1 to about 4 carbon atoms. Quaternary ammonium groups can be added in the form of any salt, i.e., combined with any anion which is substantially inert in or will not detrimentally interfere with, the process of the present invention. Preferably, the quaternary compound is in the form of a halide and optimally the same halide as is present in the aqueous solution to be extracted. Examples of such preferred quaternary ammonium compounds include tri(n-decyl) methyl ammonium chloride and tri(mixed n-$C_{8-10}$alkyl) methyl ammonium chloride, the latter being derived from a mixture of $C_8$-$C_{10}$ normal paraffinic hydrocarbons.

The above organic amines and organic phosphate esters are compounds generally known to industry and commercially available. Any other amines, esters or other compounds useful as selective extracting agents for ferric halides in the aqueous systems obtained from the halidation of iron-containing ores can also be used in the process of this invention.

As explained above, the extracting agent is preferably a liquid which is itself water-immiscible or is dissolved in a solvent which is substantially immiscible with water.

It has been found when utilizing common commercial water-immiscible solvents that solutions containing from about 2 to about 50 percent by weight and preferably from about 5 to about 30 percent by weight of the phosphate ester and/or amine extracting agents are economically useful as being sufficiently active to remove the ferric halide selectively from the aqueous solution and being sufficiently dilute in the extracting agent so that substantially no extracting agent is leached out and lost in the aqueous raffinate. If it is desired, however, more concentrated solutions can be utilized and even substantially pure amines or phosphate esters can be used. Mixtures of extracting agents can be used as long as they are not jointly reactive and do not interfere with the process of this invention.

Such solvents include generally any inert hydrocarbons which will dissolve the extracting agent, per se, and the ferric halide-extracting agent complex, and which do not react with any of the other materials present under the conditions of the extraction process. Generally, liquid aliphatic, cycloaliphatic, aromatic, cycloaliphatic-aromatic, aliphatic-aromatic or chlorinated such hydrocarbons are preferably utilized as the diluent-solvents for the ferric halide extracting medium. Optimally, the solvent has specific gravities in the range of from about 0.65 to about 0.95 and a mid-boiling point in the range of from about 120° to 615° F. (ASTM distillation.) However, substantially any liquid can be used as a solvent that meets the following criteria:

1. A solvent for the ferric halide extracting agent;
2. A solvent for the extracting agent-ferric halide complex;
3. Immiscible with water; and
4. Readily separable from water.

The concentration of the extracting agent in the solvent is determined not only by the solubility of the extracting agent per se, but also by the solubility of the extracting agent-ferric halide complex. Examples of suitable solvents include benzene, toluene, xylene, aliphatic and aromatic petroleum fractions such as naphtha and derivatives thereof and mixtures of the foregoing. In addition to the aliphatic, aromatic, cycloaliphatic-aromatic, aliphatic-aromatic hydrocarbons and cycloaliphatic hydrocarbons, chlorinated such hydrocarbon liquids can also be usefully utilized.

Light fuel oil, high flash point kerosene and other petroleum hydrocarbons, such as hexane-heptane mixtures are preferred. Generally, the aliphatic materials are most preferred because of their ready availability and ease of separation from the aqueous phase.

In addition to the solvent and the extracting agent, there can preferably also be present in the liquid extracting medium a phase modifier which prevents formation of an emulsion with, or entrainment of, the organic phase in the aqueous phase, and the formation of a third phase. This is accomplished, it is believed, by altering the interfacial tension and related physical properties of the organic-aqueous mixture during extraction. These phase modifiers are generally most useful when an aliphatic solvent is utilized and include, preferably, aliphatic alcohols containing from about 8 to about 16 carbon atoms, such as n-octyl alcohol n-decyl alcohol, n-dodecyl alcohol, n-tetradecyl alcohol, n-hexadecyl alcohol, isoctyl alcohol, 2-ethylhexyl alcohol, cyclohexanol and mixtures of these and other alcohols. Decanol is a preferred material.

Generally no more than the necessary amount of the phase modifier e.g. alcohol, which is necessary to inhibit the formation of the emulsion or prevent entrainment, should be used. Usually no more than about 25% by volume of the phase modifier is necessary. Preferably, from about 2 to about 20% by volume is satisfactory and not more than about 15% is most preferred. The phase modifier can be completely eliminated if desired and, therefore, is optional in the present procedure.

The process of the present invention is not dependent upon the particular ferric halide separation scheme utilized. It is preferred that the ferric halide be extracted from the leach solution using an extracting medium which is a liquid, because liquid-liquid extraction of a normally solid material from solution is a relatively simple and common procedure. However, other extraction procedures can be followed and other types of extractants used.

When utilizing liquid-liquid extraction from an aqueous solution of mixed metal halides, a wide range of aqueous phase-to-aqueous-immiscible-phase volume ratio can be utilized in the present invention. Generally, using a 20% by wt. solution of the amine or phosphate ester, aqueous-immiscible/aqueous phase volume ratios of from about 1:1 to about 5:1 are desirable and most preferable are from about 2:1 to about 4:1; although higher proportions of aqueous immiscible materials can be utilized, it would tend to be wasteful and result in an unnecessarily large volume of liquid being handled.

Temperature is usually not critical to the extraction and generally ambient temperatures can be utilized; preferably, of course, the temperatures should be such as to maintain the aqueous solutions and the extracting medium in the liquid phase under ambient pressure and to maintain the halides and the complex with ferric halide in solution.

The pH of the aqueous solution from which the ferric halide is extracted is preferably not greater than about 2:3, and optimally not greater than about 2.0. The critical point is that at which the ferric halide is hydrolyzed to form iron oxide or iron hydroxide which precipitates out of solution. Accordingly, the pH of the aqueous solution should be not greater than that required to maintain the ferric halide in solution.

The extraction agent must be selective for ferric halide in the particular solution to be extracted based upon the composition of the other metal halides present. That is, the aqueous solution to be treated with the extracting medium in accordance with this invention should contain sufficient ferric halide to be extractable utilizing the extraction agent selected, and the extraction medium should not extract other metal values present, e.g., manganese.

Utilizing the amine or phosphate ester ferric halide extracting agents defined above, the aqueous solution can be saturated substantially in each of the various metal halides commonly associated with iron in manganiferous ores, i.e., nickel, cobalt, copper and manganese.

When a liquid-liquid extraction scheme is utilized, the ferric halide is stripped from the water-immiscible extraction medium by water; preferably, the water is sufficiently acid to prevent the hydrolysis of the ferric halide, and generally a pH of not greater than about 2.3 is maintained. Although the pH can be maintained utilizing any acid, preferably, however, a hydrogen halide acid is preferred; however, other acid anions which are non-interfering with the process of the present invention can also be present and, therefore, materials such as sulfuric acid, nitric acid, etc. can be utilized.

The volume phase ratio of an aqueous stripping liquid-to-the water-immiscible extraction medium is preferably in the range of from about 1 to 5 to about 1 to 1; however, the best results are obtained when a ratio of stripping liquid to extract phase of at least about 1:4 to about 1:1 is maintained.

Both the extraction of the ferric halide from the aqueous solution of mixed metal halides and the stripping of ferric halide from the water-immiscible extraction medium can be carried out utilizing any conventional contact apparatus. The material can be carried out in a single-stage batch basis or in a continuous flow unit; preferably, in a continuous unit the flow of the two phases is counter-current, such as in a continuous, countercurrent mixer-settler unit. The number of stages can be varied as required based on the efficiency of extraction and stripping of the specific materials being treated and of the apparatus being utilized. By adjusting the relative volumes of the aqueous mixed metal halide solution and of the water-immiscible extraction medium, it is possible to obtain a substantially complete removal of ferric halide from the aqueous solution into the organic medium. Similarly by adjusting the ratio of the extraction medium to the aqueous stripping liquid, substantially complete removal of the ferric halide from the extraction medium can be obtained. If there is any residual ferric halide remaining in the extraction medium, it can be recycled together with the extraction medium for further extraction use without interfering with the process of the present invention. Indeed, it is generally assumed that in continuous operation, the extraction medium is stripped and returned for further use to the extraction step with a gradual buildup of ferric halide until an equilibrium level is reached.

Useful apparatus, in addition to mixer-settler units, include for example, packed and plate-type towers, baffled towers and pulse columns, generally also operated countercurrently.

The ferric halide is readily converted to ferric oxide and the corresponding hydrogen halide by evaporation of the water from solution and hydrolysis, e.g., reaction with water and the ferric halide at a temperature of at least 200° C. The vaporous hydrogen halide is readily removed overhead and separated from the ferric oxide solid. The hydrogen halide can then be recycled to the initial halidation stage.

The iron-free aqueous solution, e.g., the aqueous raffinate from the liquid extraction halide, can be next treated so that the manganese halide in the iron-free aqueous solution can be crystallized and separated from the aqueous solution, where the manganese halide was not crystallized out of the hot, leach solution, immediately upon cooling after leaching, and prior to removing iron value. This can be accomplished by simply evaporating the water to a point where the manganese halide crystallizes and then separating any remaining liquor therefrom. Evaporation can be carried out by either heating the solution to its boiling point, at atmospheric pressure, or heating, so as to cause evaporation of the water at lower pressures and lower temperatures. Generally, a combination of these two procedures is most effective; however, the normal boiling point of the solution is not sufficiently high so as to degrade the manganese compound.

The iron-free aqueous solution can also be treated to precipitate the heavy metal values, such as nickel, which may be present in the solution. The precipitation can be carried out to obtain the metals in the form of an insoluble compound. To obtain the insoluble metal compounds, the aqueous solution can be treated with a reagent which has substantially no effect on any manganese present in the aqueous solution but results in the precipitation, as an insoluble compound, of the heavy metals which are present. For example, treating the aqueous raffinate with a reagent sulfide, e.g. bubbling hydrogen sulfide gas through the solution, when the raffinate is at a pH of at least about 6.0, and preferably from about 6.4 to about 6.8, and at a temperature of from about 10° to about 50° C, causes the precipitation of nickel sulfide, zinc sulfide, lead sulfide, and chromium sulfide, but not of manganese sulfide. The precipitate can be separated from the aqueous solution by conventional liquid-solid separation methods, e.g., filtration or centrifugation. In addition to hydrogen sulfide, other useful precipitating agents include ammonium sulfide and alkali metal sulfides, e.g. sodium sulfide. See *Electrolytic Manganese And Its Alloys*, by R. S. Dean, and U.S. Pat. Nos. 2,316,750 and 2,347,456.

The aqueous solution effluent from the precipitation step contains dissolved any remaining manganese halide leached from the ore, and the halides of other metals which were not precipitated out. Such aqueous effluent can be recycled to the leaching step, if desired.

In order to recover the halide reagent from the manganese halide, the solid manganese halide is hydrolyzed to form manganese oxide and the corresponding hydrogen halide. The procedure is preferably carried out at elevated temperatures so as to form the gaseous hydrogen halide, which can then be recovered in a relatively pure state.

The solid manganous halide, generally separated from the aqueous liquor as the tetrahydrate, is preferably dehydrated as by heating, to the anhydrous salt. The anhydrous salt is then hydrolyzed by being heated to a temperature in the range of from about 400° C to about 700° C in an air oven.

It is believed that the reaction goes according to the following reaction equation:

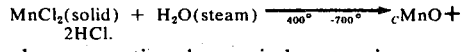

$$MnCl_2(solid) + H_2O(steam) \xrightarrow{400°-700°C} MnO + 2HCl.$$

The above reaction is carried out using manganous chloride as an example of the manganous halide which can be used. However, any of the halides, especially the chlorides, bromides and iodides are useful in the present process.

Alternatively, the manganous halide tetrahydrate can be used directly. The reaction is as follows:

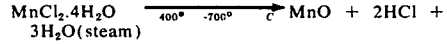

$$MnCl_2 \cdot 4H_2O \xrightarrow{400°-700°C} MnO + 2HCl + 3H_2O(steam)$$

The hydrogen halide formed in the hydrolysis of the manganese halide is removed overhead and can be recycled to react with additional fresh manganiferous ore. The manganese oxide, can be utilized for various purposes, described above, or can be further treated and reduced to form the manganese metal, in accordance with various conventional metallurgical procedures.

The hydrogen halide vapor can be dissolved in water to form an aqueous hydrogen halide solution, if desired, or recycled in the vapor state to be used in the halidation of the ore.

Thus, in accordance with the present process, when utilizing a hydrogen halide for the halidation of a manganese oxide ore, the process of this invention results in the formation of elemental halogen as a valuable by-product and the recovery of a major portion of the remaining halide value as hydrogen halide for recycling to the halidation reaction.

The drawing is a schematic flow diagram for a preferred continuous flow process in accordance with this invention, utilizing a mixture of aqueous hydrogen halide and additional gaseous hydrogen halide as the halidation reagent.

Referring to the drawing, a manganese oxide ore is crushed in a crusher-grinder 1, to a particle size of not greater than about 35 mesh, U.S. sieve scale. The crushed ore then passes via line 2 to the five-stage halidation reactor, generally indicated by the numeral 3, where it is contacted countercurrently with a hot aqueous hydrogen halide solution, e.g., at a temperature of about 100° C. The halogen, e.g., chlorine, by-product is vented from each stage and additional hydrogen halide gas is passed into the aqueous solution in one or more of the stages. The hot aqueous leach solution leaving the final state E via line 8 has a pH of from 1–2 and contains, dissolved, the soluble metal halides, e.g. chlorides, extracted from the ore.

The hot leach solution is then passed to a cooling vessel 4, where it is cooled to substantially ambient temperature. A portion of the manganese halide, e.g. $MnCl_2 \cdot 4H_2O$, crystallizes out and is separated from the remaining leach solution in the separator 6, e.g. filter or centrifuge. The crystalline manganese halide tetrahydrate is removed and the cooled leach solution passes to an extracting-stripping section 5 to remove the ferric halide from the leach solution.

In the extraction and extracting-stripping process 5, the leach solution is passed through four mixer-settler stages countercurrently to an organic solution of an amine extracting medium, e.g., comprising 15% by volume of N-lauryl-N-(1,1-dimethyleicosyl)-amine,

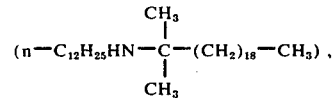

$$(n-C_{12}H_{25}HN-\underset{\underset{CH_3}{|}}{\overset{\overset{CH_3}{|}}{C}}-(CH_2)_{18}-CH_3),$$

and 15% by volume isodecanol, in kerosene solvent at an aqueous-to-organic ratio of e.g., 1:1 by volume, and then contacting the organic extract thus formed, with water having a pH of 2, in a countercurrent, e.g., three-stage, mixer-settler system at an organic-to-aqueous ratio of, e.g., 1:1 by volume, to strip out the ferric halide, e.g. $FeCl_3$. The aqueous strip solution containing the, e.g. $FeCl_3$, is then passed to the iron halide reactor 7, where the solution is evaporated and the halide is heated to a temperature of about 200° C in the presence of water to form e.g. HCl and $Fe_2O_3$. The HCl thus formed is recycled to the halidation reactor 3.

A portion of the iron-free raffinate from the ferric halide extracting system 5 is recycled via line 15 to the halidation reactor 3 and a portion of the raffinate is then passed to a sulfide precipitator 9, where it is contacted preferably with hydrogen sulfide. The heavy metal values other than manganese are precipitated as sulfides. The halides of alkali metals or the alkaline earth metals, are not affected by this treatment. The heavy metal sulfides precipitated can be separated by filtration and removed via line 10 to be further treated to separate and purify the individual valuable metal values obtained thereby, if desired. If the ore being processed is, for example, an ocean floor nodule ore, the heavy metals comprise especially nickel, cobalt and copper.

The aqueous effluent leaving the sulfide precipitator 9 after the sulfide precipitation step comprises manganese halide and usually also one or more alkali metal halides and alkaline earth metal halides. A portion of the effluent is recycled via line 17 to the halidation reactor 3. The other portion of the effluent is bled off and discarded to limit the build-up of metal salts, e.g alkaline earth metal halides or alkali metal halides, in the process streams.

The wet manganous halide crystals are passed to a drying oven 21 where they are dried to the anhydrous salt.

The anhydrous manganous halide is contacted with steam in oven 19, which is heated to a temperature of about 550° C. to form manganese oxide and hydrogen halide. The hydrogen halide, e.g. HCl, which is formed is withdrawn overhead through conduit 16 and recycled to the halidation reactors 3.

The following examples are preferred embodiments of procedures carried out in accordance with the process of the present invention. They are only exemplary of the present invention and do not limit the scope thereof which encompasses the procedures as broadly defined above and all equivalents thereof.

EXAMPLE 1

A sample of ocean floor nodule ore (a manganese oxide ore which contains 29% by weight manganese and 6% by wt. iron, as the primary metal values, and secondary proportions of copper, cobalt and nickel), 692 grams (gm), is placed in a pot and covered with saturated hydrochloric acid into which is passed gaseous hydrogen chloride until a total of 687 gm of HCl has been reacted with the ore. During the reaction the temperature was maintained at about 100° C. The mixture is agitated until the reaction is completed; then the liquid is separated to form a liter of aqueous solution containing 200 g/l $MnCl_2$, measured as manganese, and 41.5 g/l $FeCl_3$, measured as iron. The solution is permitted to cool to 20° C and a large volume of crystals is formed. The crystals and remaining solution are separated. The crystals are primarily manganous chloride tetrahydrate (344 gm, as $MnCl_2$). The solution contains 100 gm/l Mn and 50 gm/l Fe.

The solution is next treated to extract iron and the crystals are converted to manganese oxide and hydrogen chloride, both as explained above.

EXAMPLE 2

The above Example 1 was repeated but a sample of the ore weighing 1035 gm was treated with a total of 1025 gm HCl and water to form a liter of solution containing 300 gm/l Mn and 62 gm/l Fe. After cooling the solution contained 85 gm/l Mn and 74 gm/l Fe, and manganese chloride tetrahydrate crystallized out (582 gm as $MnCl_2$), and was removed.

The patentable embodiments of this invention which are claimed are as follows:

1. A process for the preparation of relatively pure manganese oxide from manganese oxide ore, the ore comprising manganese and iron values, the process comprising 1) halidating the ore with a hydrogen halide selected from the group consisting of hydrogen chloride, hydrogen bromide and hydrogen iodide to form the corresponding elemental halogen and leaching with an aqueous solution to form an aqueous leach solution comprising the halides of divalent manganese and of trivalent iron; 2) treating the leach solution so as to, in either chronological order, a) selectively extract the ferric halide from the aqueous leach solution to form an iron-free raffinate solution; and b) separate solid manganous halide from the aqueous solution; 3) reacting the solid manganous halide with water at elevated temperatures in the range of from about 400° C to about 700° C, to yield manganese oxide and gaseous hydrogen halide; and 4) recycling the hydrogen halide so formed to halidate additional ore.

2. The process of claim 1 wherein the ore also comprises a nonferrous metal relatively more noble than manganese and wherein the process comprises, in addition, after extracting the ferric halide, removing from the aqueous leach solution the nonferrous metal by precipitating the nonferrous metal and separating the solid precipitate from the aqueous solution.

3. The process of claim 1 wherein ore is halidated with an aqueous solution of a hydrogen halide and wherein the metal halides formed are leached out by the solution.

4. The process of claim 3, wherein the ore is contacted with an aqueous solution of hydrogen halide, to which is added additional gaseous hydrogen halide, at a temperature of at least about 90° C to form a hot aqueous solution which is concentrated in dissolved manganous halide and wherein the process comprises, in addition, cooling the hot aqueous solution, whereby solid manganese halide is obtained by crystallization, and separating the crystals from the cooled aqueous solution, and wherein the cooled aqueous solution is then contacted with an extracting medium comprising an extractant selected from the group consisting of organic amines and organic phosphate esters in order to selectively extract ferric halide.

5. The process of claim 4, wherein the hydrogen halide is hydrogen chloride.

6. The process of claim 4 comprising comminuting the ore before contacting with the hydrogen halide.

7. The process of claim 4 comprising contacting the extracting medium rich in ferric halide with water, to strip ferric halide from the extracting medium; separating the ferric halide-rich aqueous solution from the ferric halide-depleted extracting medium, recycling the extracting medium for further extraction duty, converting the ferric halide to ferric oxide and hydrogen halide, and recycling the hydrogen halide to contact the ore.

8. The process of claim 1, comprising in addition dehydrating the solid manganous halide to obtain substantially anhydrous manganous halide, prior to reacting with water.

9. The process of claim 1 wherein the ore is halidated with anhydrous hydrogen halide at a temperature of from about 200° to about 600° C. and the halidated ore is then leached with an acidic aqueous solution at a temperature of from about 0° to about 110° C.

10. The process of claim 9, wherein the halidated ore is leached at a temperature of at least about 90° C to form a hot aqueous solution which is concentrated in dissolved manganous halide and wherein the process comprises, in addition, cooling the hot aqueous solution, whereby the solid manganese halide is separated by crystallization, and separating the crystals from the cooled aqueous solution, and wherein the cooled aqueous solution is then selectively extracted to remove ferric halide utilizing an extracting agent selected from the group consisting or organic amines and organic phosphate esters.

11. The process in accordance with claim 1, comprising in addition, contacting the ferric halide with water, at a temperature of at least about 200° C so as to form iron oxide and the corresponding hydrogen halide.

12. The process of claim 1, wherein the hydrogen halide is hydrogen chloride.

13. A process for the preparation of manganous oxide from a manganese oxide ore, the ore comprising primary proportions of manganese and iron values, the process comprising 1) contacting the manganese oxide ore with hydrogen halide selected from the group consisting of hydrogen chloride, hydrogen bromide and hydrogen iodide, to form the corresponding elemental halogen and leaching with an aqueous solution to form an aqueous leach solution comprising the halides of manganese and iron; 2) separating solid manganous halide from the aqueous solution; 3) reacting the manganous halide with water at an elevated temperature so as to form manganous oxide and hydrogen halide vapor; and 4) recycling the hydrogen halide to contact additional manganese ore.

14. The process of claim 13, wherein the ore comprises, in addition, a nonferrous heavy metal in addition to manganese, and wherein the process comprises, in addition, after forming the aqueous raffinate depleted in ferric halide, precipitating the nonferrous metal from the aqueous raffinate solution and separating the insoluble precipitate from the aqueous solution.

15. The process of claim 13, comprising in addition dehydrating the solid manganous halide to obtain substantially anhydrous manganous halide, prior to reacting with water.

16. A process for the preparation of manganese oxide from a manganese oxide ore, the ore comprising primary proportions of manganese and iron values, the process comprising: 1) contacting the manganese oxide ore with an aqueous solution of hydrogen halide, the hydrogen halide being selected from the group consisting of hydrogen chloride, hydrogen bromide and hydrogen iodide, to which is added additional hydrogen halide in the gaseous state to form the corresponding elemental halogen and an aqueous leach solution comprising the halides of manganese and iron; 2) separating solid manganous halide from the aqueous leach solution; 3) reacting the manganous halide with water at an elevated temperature so as to form manganous oxide and hydrogen halide vapor; and 4) recycling the hydrogen halide to contact additional manganese ore.

17. The process of claim 16, comprising in addition dehydrating the solid manganous halide to obtain substantially anhydrous manganous halide, prior to reacting with water.

18. The process of claim 16, wherein the ore is contacted with the hydrogen halide at a temperature of at least about 90° C.

19. The process of claim 18, wherein the leach solution formed is concentrated in manganous halide, and wherein the process comprises in addition, cooling the leach solution, whereby solid manganous halide is obtained by crystallization.

20. The process of claim 16, wherein the manganous halide is reacted with water at a temperature in the range of from about 400° to about 700° C.

21. The process of claim 20, wherein the elevated temperature is in the range of from about 500° C to about 600° C.

22. The process of claim 16, comprising in addition contacting the aqueous leach solution with an extracting medium, capable of selectively extracting ferric halide from the aqueous solution so as to form an aqueous raffinate depleted in ferric halide and an extract medium rich in ferric halide.

23. The process of claim 22, wherein the ore comprises, in addition, a nonferrous heavy metal in addition to manganese, and wherein the process comprises, in addition, after forming the aqueous raffinate depleted in ferric halide, precipitating the nonferrous metal from the aqueous raffinate solution and separating the insoluble precipitate from the aqueous solution.

24. The process of claim 22, wherein the extracting medium is a water-immiscible liquid, capable of selectively extracting ferric halide from the leach solution.

25. The process of claim 24, wherein the water-immiscible liquid comprises a solution of an agent, capable of extracting selectively ferric halide from an aqueous solution comprising also manganese halide, in a solvent for the extracting agent which is immiscible with water.

26. The process of claim 25, wherein the extracting medium comprises a liquid solution of an organic phosphate ester or of an alkylamine in a water-immiscible organic solvent.

27. The process of claim 23, wherein the product of the halidation comprises manganese halide, ferric halide, and a halide of at least one nonferrous heavy metal selected from the group consisting of nickel, cobalt, copper, lead and zinc.

28. The process of claim 16, wherein the ore is contacted with the hydrogen halide at a temperature in the range of from about 80° C to about 110° C.

29. The process of claim 19, wherein the hydrogen halide is hydrogen chloride.

30. A process for the preparation of relatively pure manganese oxide from a manganese oxide ore, the ore comprising manganese and iron values, the process comprising 1) halidating the ore with hydrogen chloride and leaching with an aqueous solution at a temperature of at least about 90° C so as to form a hot concentrated aqueous solution comprising manganous chloride and ferric chloride; 2) cooling the hot leach solution to a temperature in the range of from about 0° to about 60° C so as to crystallize out at least about 20 % of the dissolved manganous chloride and separating the solid manganous chloride from the aqueous solution; 3) reacting the solid manganous chloride with water at a temperature in the range of from about 400° C to about 700° C, to yield manganese oxide and gaseous hydrogen chloride; and 4) recycling the hydrogen chloride so formed to halidate additional ore.

31. A process for the preparation of relatively pure manganese oxide from a manganese oxide ore, the ore comprising manganese values and iron values, the process comprising 1) halidating the ore with a gaseous hydrogen halide selected from the group consisting of hydrogen chloride, hydrogen bromide and hydrogen iodide at a temperature of at least about 200° C; to form the corresponding elemental halogen and halides of divalent manganese and of trivalent iron; 2) contacting the halidated ore with water at a temperature of at least about 200° C to convert the ferric halide to iron oxide and hydrogen halide; 3) leaching the halidated ore with water at a temperature of at least about 90° C to form hot aqueous leach solution concentrated in manganous halide; 4) cooling the hot leach solution so as to crystallize out manganous halide, and separating solid manganous halide from the aqueous solution; 5) reacting the solid manganous halide with water at elevated temperatures in the range of from about 400° C to about 700° C, to yield manganese oxide and vaporous hydrogen halide; and 6) recycling the hydrogen halide so formed to halidate additional ore.

32. The process of claim 31, wherein the hydrogen halide is hydrogen chloride.

33. The process of claim 30, wherein the ore also comprises a nonferrous heavy metal value in addition to manganese and wherein the process comprises, in addition, after crystallizing out the manganous halide, removing from the aqueous raffinate solution the nonferrous metal value by precipitating the non-ferrous metal value and separating the solid precipitate from the aqueous solution.

34. The process of claim 33, comprising in addition dehydrating the solid manganous halide to obtain substantially anhydrous manganous halide, prior to reacting with water.

35. A process for obtaining relatively pure manganous halide from a manganese oxide ore, the ore comprising manganese values and iron values, the process comprising:

1. halidating the ore with a hydrogen halide selected from the group consisting of hydrogen chloride, hydrogen bromide, and hydrogen iodide, the ore being halidated with sufficient hydrogen halide to react with substantially all of the metal values of the ore, and leaching with an aqueous solution at a temperature of at least about 90° C so as to form a hot concentrated aqueous solution comprising manganous halide and ferric halide;

2. Cooling the hot aqueous solution to a temperature in the range of from about 0° to about 60° C so as to preferentially crystallize out dissolved manganous halide, wherein the concentration of manganous halide in the hot concentrated aqueous solution is greater than the saturation concentration for manganous halide in the aqueous solution at the temperature to which the solution is cooled and the concentration of the remaining metal values being below the saturation concentration at the temperature to which the solution is cooled; and 3. separating the crystallized solid manganous halide from the remaining aqueous solution.

36. The process of claim 35, wherein relatively pure manganous halide is crystallized from the aqueous solution in an amount equal to at least about 20% of the total manganous halide dissolved in the hot concentrated aqueous solution.

37. The process of claim 35, wherein the ratio of manganese value to iron value in the ore is at least about 5 : 1.

38. The process of claim 36, wherein the ore is simultaneously halidated and leached by an aqueous solution of the hydrogen halide to which is added additional hydrogen halide in the gaseous state.

39. The process of claim 38, wherein the hydrogen halide is hydrogen chloride.

* * * * *